(12) United States Patent
King

(10) Patent No.: US 12,072,803 B1
(45) Date of Patent: Aug. 27, 2024

(54) SYSTEMS AND METHODS FOR TRACKING DATA CACHE MISS REQUESTS WITH DATA CACHE TAGS

(71) Applicant: Advanced Micro Devices, Inc., Santa Clara, CA (US)

(72) Inventor: John M. King, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/855,681

(22) Filed: Jun. 30, 2022

(51) Int. Cl.
*G06F 12/08* (2016.01)
*G06F 9/30* (2018.01)
*G06F 12/0811* (2016.01)
*G06F 12/0891* (2016.01)

(52) U.S. Cl.
CPC ...... *G06F 12/0811* (2013.01); *G06F 9/30043* (2013.01); *G06F 12/0891* (2013.01); *G06F 2212/1021* (2013.01)

(58) Field of Classification Search
CPC ............. G06F 12/0811; G06F 9/30043; G06F 12/0891; G06F 2212/1021
See application file for complete search history.

(56) References Cited

U.S. PATENT DOCUMENTS 6,286,082 B1 * 9/2001 Moudgal ............. G06F 12/0804
710/39
2015/0026411 A1 * 1/2015 Lippert ............... G06F 12/0833
711/146
2019/0266090 A1 * 8/2019 Mola .................... G06F 11/3636
2020/0174936 A1 * 6/2020 Wang .................. G06F 12/0871
2021/0365374 A1 * 11/2021 Chachad ................ G06F 12/10

FOREIGN PATENT DOCUMENTS

JP 4486750 B2 * 6/2010 ......... G06F 12/0864

OTHER PUBLICATIONS

Blundell et al., InvisiFence: Performance-Transparent Memory Ordering in Conventional Multiprocessors, URL: https://web.eecs.umich.edu/~twenisch/papers/isca09-invisifence.pdf, ISCA 2009, pp. 1-12.

* cited by examiner

Primary Examiner — Masud K Khan
(74) Attorney, Agent, or Firm — Greenberg Traurig, LLP

(57) ABSTRACT

The disclosed computer-implemented method for tracking miss requests using data cache tags can include generating a data cache miss request associated with data requested in connection with a cacheline and allocating a miss address buffer entry for the miss request. Additionally, the method can include, setting a fill-pending flag associated with the cacheline in response to the data associated with the data cache miss request being absent from a first data cache, and de-allocating the miss address buffer entry. In the event that another load or store operation requests the same data associated with the cacheline while the fill-pending flag is set, the method can include monitoring for a fill response associated with the miss request until the fill response is received. Upon receipt of the fill response, the method can include re-setting the fill-pending flag associated with the cacheline.

20 Claims, 6 Drawing Sheets

SYSTEMS AND METHODS FOR TRACKING DATA CACHE MISS REQUESTS WITH DATA CACHE TAGS

BACKGROUND

Example processor architectures often include one or more levels of data caches. For example, in order to increase processing speed, example processor architectures include one or more levels of data caches located near the processor core so as to shorten the distance that a signal needs to travel at run-time. In one or more examples, such data caches include data copied from one or more memories that are farther away and slower to access. As such, the same data can be copied to multiple memory locations within the one or more data caches of the processor.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
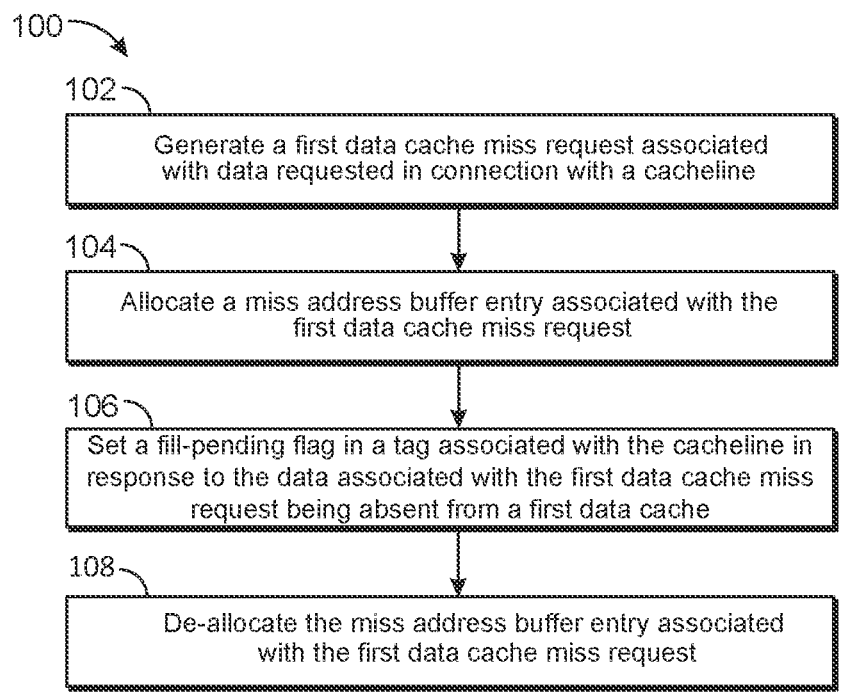
FIG. 1 is a flow diagram of an exemplary computer-implemented method for tracking data cache miss requests utilizing data cache tags according to one or more implementations.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for tracking data cache miss requests with data cache tags. Generally, a load or store operation can request data from a memory address, but that address is not found in a particular level of the cache. When this occurs, example data caching systems generally issue a data cache miss request associated with the cacheline where the requested memory location resides and utilize a missing address buffer (MAB) to track further efforts to fill in the missing data. To illustrate, in response to a load operation requesting data from memory location "A," an example data caching system can look up memory location "A" only to find that memory location "A" is not present in the data cache.

Following this lookup, the example data caching system can generate a miss request associated with the memory location "A" and allocate an entry for the miss request in the MAB. At that point, the example data caching system can further transmit the miss request to the next level of data cache. The example data caching system can continue to transmit the fill request to deeper levels of data cache until the requested data is found. At that point, the example data caching system can provide the requested data back to the requesting load operation, and de-allocate the MAB entry for the associated miss request.

Accordingly, the MAB can track miss requests that are pending, so as to avoid issuing a duplicate request for the same cacheline. In the absence of the MAB, duplicate miss requests for the same cacheline often result in performance problems (by taking up request and queue bandwidth) or functional problems, by breaking cache coherence. The MAB avoids these problems by allowing operations that request the same cacheline as another request to attach to the same miss request.

As such, the method by which example data caching systems utilize the MAB in responding to tracking data cache miss requests gives rise to various technical problems. For instance, example data caching systems' use of the MAB is inflexible. In most implementations, the MAB is fully associative. As such, the MAB generally cannot scale to accommodate a larger number of miss requests. This becomes problematic, however, when data cache size is typically much bigger than the MAB. In other words, the MAB can only accommodate a fraction of the potential miss requests that can arise from the cachelines of the data cache.

This inflexibility, in turn, leads to various computational inefficiencies. To illustrate, example data caching systems' use of the MAB typically includes MAB entry allocation upon receipt of the data cache miss request. Often, that entry remains allocated until a response to the miss request is received. This is problematic, however, because the example data caching system can have to look for the requested data in a level-two cache, a level-three cache, and so forth even perhaps down to DRAM or beyond. As such, example data caching systems have no way of predicting how long a MAB entry will remain allocated. Due to this potentially lengthy allocation of space in the MAB, example data caching systems can cause CPU stalls when the MAB fills up and additional data cache miss requests cannot be accommodated. With every stall, example data caching systems waste computing resources by keeping those resources in an idling state and slow overall processor operation.

While example data caching systems are often limited by the size and timing of a miss address buffer (MAB), the systems and methods described herein can minimize time spent by miss requests in the MAB. Instead, these systems and methods leverage existing tags associated with cachelines in the level-one data cache to track the same information. By tracking miss request information utilizing data cache tags associated with affected cachelines, the systems and methods described herein are not limited by the inflexibilities and resulting inefficiencies of a MAB in tracking miss requests.

In more detail, the systems and methods described herein can generate a load or store operation requesting data from a particular memory location within a level-one data cache. In response to determining that the requested data is not found in the level-one data cache, the systems and methods described herein can generate a data cache miss request associated with the missing data. In one or more implementations, the systems and methods can further allocate an entry within the MAB for the miss request before transmitting the data cache miss request for the missing data to a level-two cache.

While determining whether the requested data is found in the level-two cache, the systems and methods described herein can move the miss request information to a cacheline associated with the particular memory location and de-allocate the MAB entry. For example, the systems and methods described herein can allocate a location in the level-one data cache to hold the requested cacheline, set a fill-pending flag or state associated with the cacheline to indicate that there is an active fill request associated with the cacheline. The cacheline is not yet filled into the level-one data cache and is not yet usable by the load or store operation that requested it, but a location has been allocated for it in the level-one data cache. At this point, the systems and methods described herein can release the MAB space that would have otherwise been tied up for an unknown number of cycles while a response to the data cache miss request for the missing data was generated.

Accordingly, the systems and methods discussed herein provide solutions to technical problems presented by example data caching systems. For example, rather than tying up MAB space while waiting for missing data to be found in any of a number of data cache levels, the systems and methods discussed herein quickly release MAB resources while trying to locate missing data in the very next level of data cache beyond the base data cache level. As such, the systems and methods described herein increase the flexibility of the MAB because the MAB will have greater miss request capacity over time. It follows that by increasing the throughput of miss requests through the MAB, the systems and methods described herein further reduce the computational waste generated by processor stalls that result from the MAB reaching capacity.

As will be described in greater detail below, the present disclosure describes various systems and methods for tracking data cache miss requests with data cache tags. In one implementation, a method for tracking data cache misses with data cache tags can include generating a first data cache miss request associated with data requested in connection with a cacheline and allocating a miss address buffer entry associated with the first data cache miss request. The method can further include setting a fill-pending flag in a tag associated with the cacheline in response to the data associated with the first data cache miss request being absent from a first data cache, and de-allocating the miss address buffer entry associated with the first data cache miss request.

In one or more implementations, the method can further include receiving a second load or store operation referencing the data previously requested in connection with the cacheline, in response to the fill-pending flag in the tag associated with the cacheline being set, monitoring for a fill response associated with the first data cache miss request, and upon receiving the fill response associated with the first data cache miss request, providing the data requested in connection with the first data cache miss request to the second load or store operation.

In one or more implementations, generating the first data cache miss request is in response to receiving a first load request for data associated with the cacheline, and failing to locate the data in a first data cache. Additionally, allocating the miss address buffer entry associated with the first data cache miss request can include configuring a blank entry in a miss address buffer, and adding information associated with the first data cache miss request to the blank entry in the miss address buffer.

In one or more implementations, the method can further include transmitting the first data cache miss request to the second data cache. Additionally, the method can also include failing to locate the data associated with the first data cache miss request in the second data cache and transmitting the first data cache miss request to a third data cache. The method can further include transmitting, to the second cache, the index and way of a location in the first data cache to hold the cacheline when the cacheline is allocated into the level-one data cache. The method can further include receiving, from the second data cache, a fill response associated with the first data cache miss request including an index and way of the location in the first data cache to hold the cacheline.

In at least one implementation, the method can further include receiving a fill response associated with the first data cache miss request and re-setting the fill-pending flag in the tag associated with the cacheline. Additionally, in some implementations, receiving the fill response associated with the first data cache miss request can include receiving the cacheline associated with the requested data and an indication of a location allocated for the cacheline in the first data cache.

In one example, a processor for tracking data cache misses with data cache tags can include a first data cache, a second data cache, and a level-three data cache, a miss address buffer, and a logic layer that causes the processor to: generate a first data cache miss request associated with data requested in connection with a cacheline and allocate a miss address buffer entry associated with the first data cache miss request. The logic layer can further cause the processor to set a fill-pending flag in a tag associated with the cacheline in response to the data associated with the first data cache miss request being absent from a first data cache, and de-allocate the miss address buffer entry associated with the first data cache miss request.

In some examples, the above-described method can be encoded as computer-readable instructions on a non-transitory computer-readable medium. For example, a computer-readable medium can include one or more computer-executable instructions that, when executed by at least one processor of a computing device, can cause the computing device to perform acts including generating a first data cache miss request associated with data requested in connection with a cacheline, allocating a miss address buffer entry associated with the first data cache miss request, and setting a fill-pending flag in a tag associated with the cacheline in response to the data associated with the first data cache miss request being absent from a first data cache, and de-allocating the miss address buffer entry associated with the first data cache miss request.

Features from any of the implementations described herein can be used in combination with one another in accordance with the general principles described herein. These and other implementations, features, and advantages will be more fully understood upon reading the following detailed description in conjunction with the accompanying drawings and claims.

Figure 2:
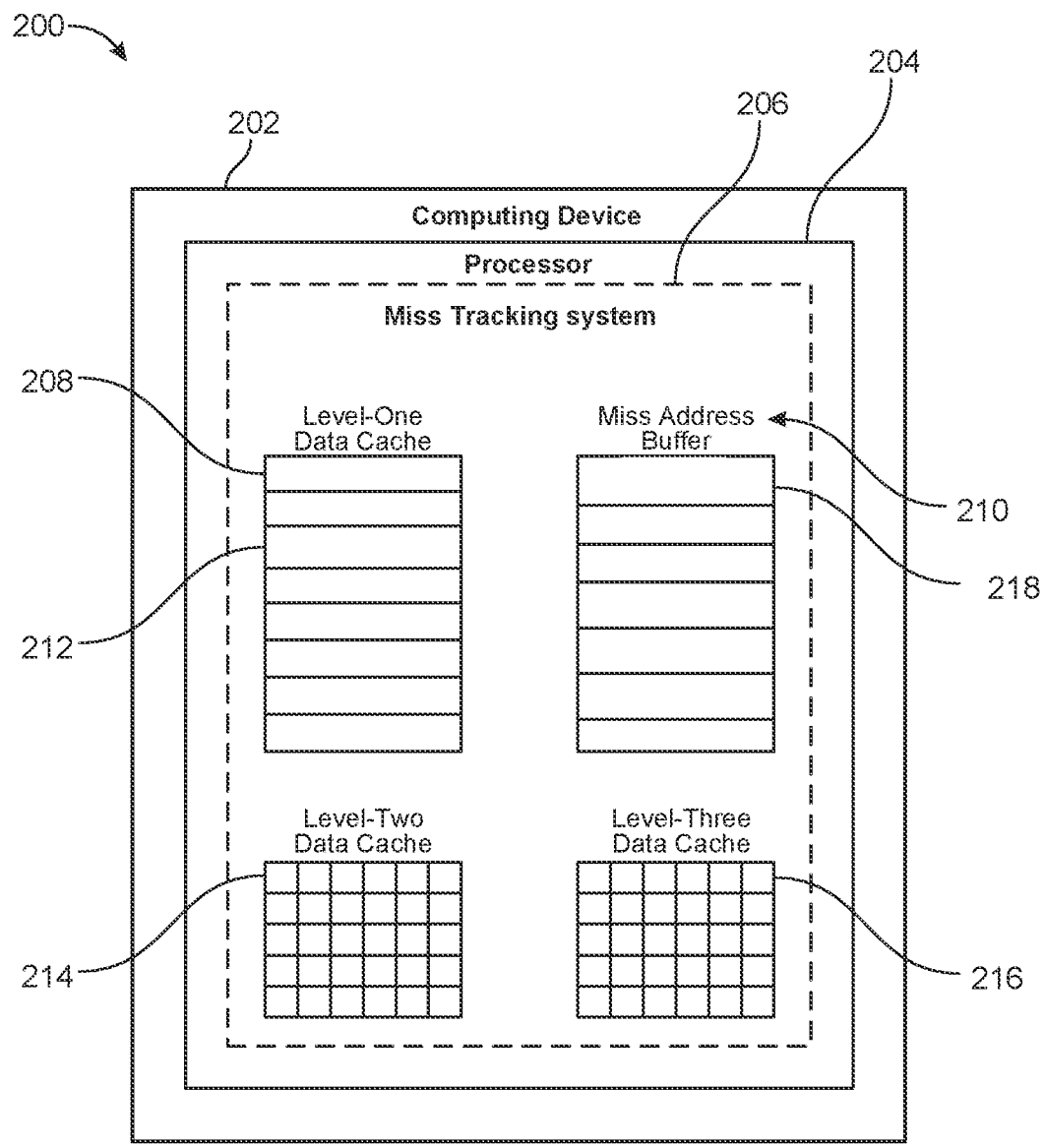
FIG. 2 is a diagram of a miss tracking system operating within a processor of a computing device according to one or more implementations.
Figure 3:
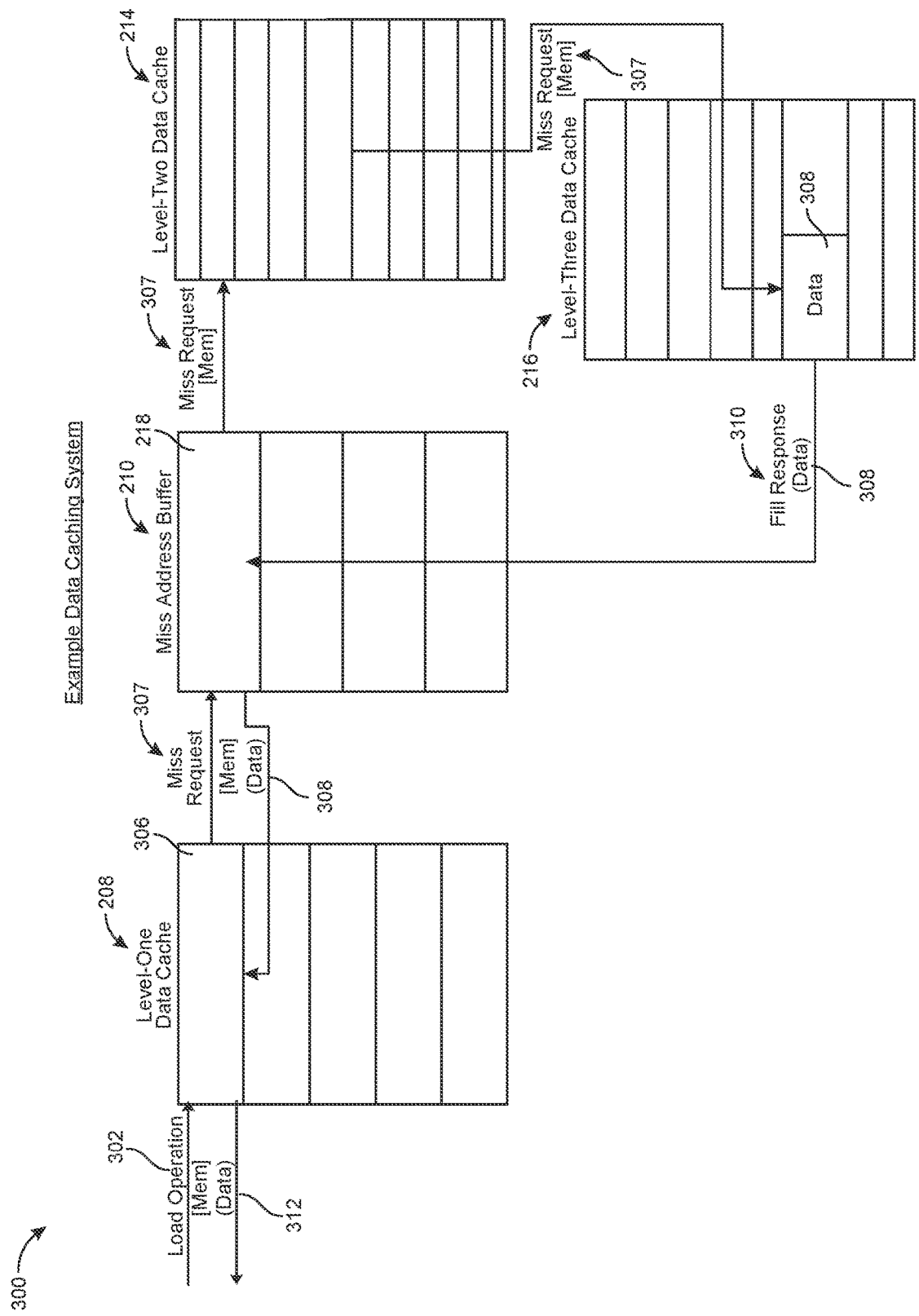
FIG. 3 illustrates a miss tracking example in connection with an example data caching system according to one or more implementations.
Figure 4A:
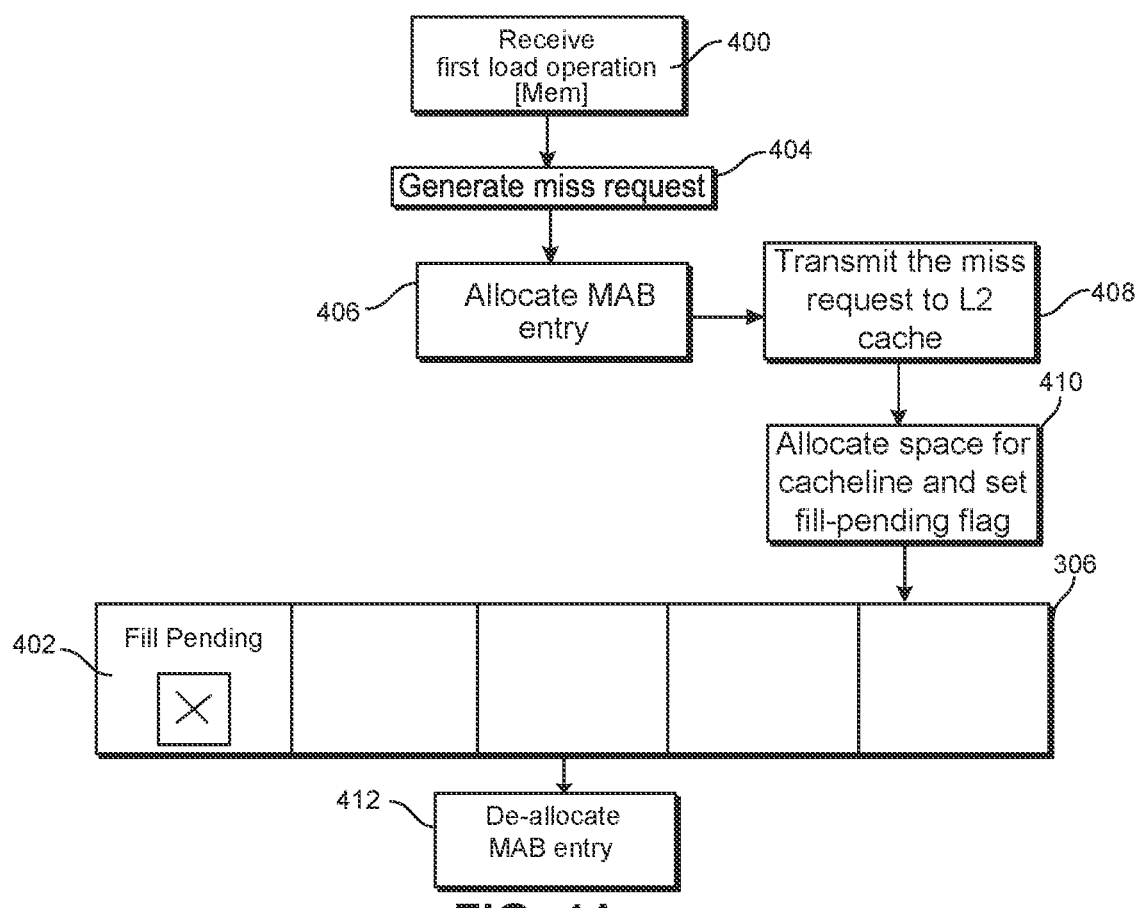
FIGS. 4A-4C is a sequence diagram of the miss tracking system tracking a data cache miss request utilizing a cacheline tag according to one or more implementations.
Figure 4B:
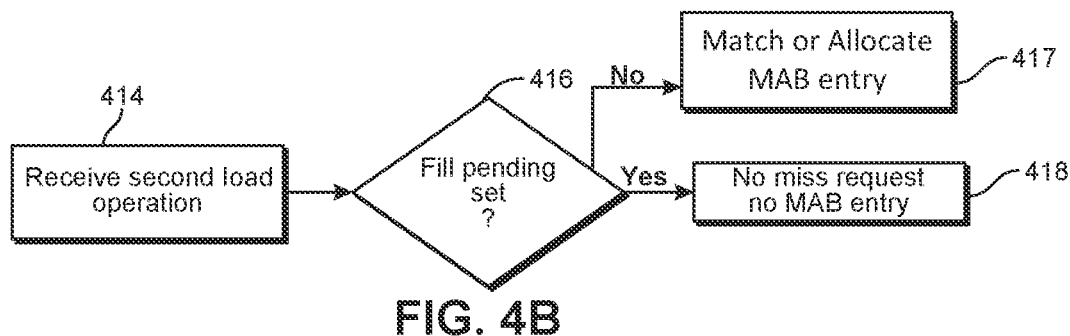
Figure 4C:
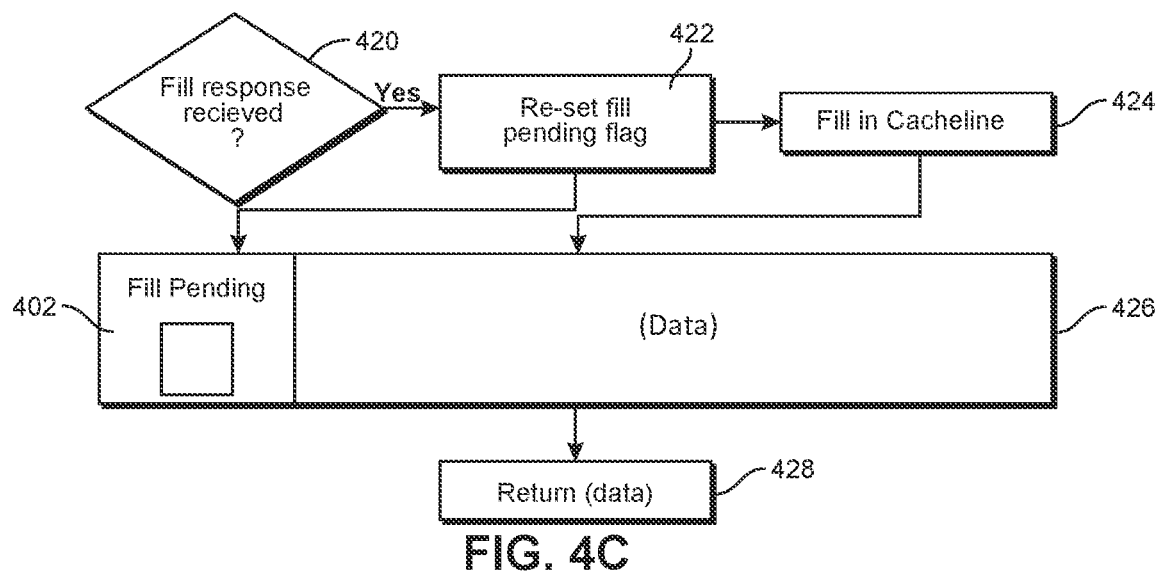
Figure 5:
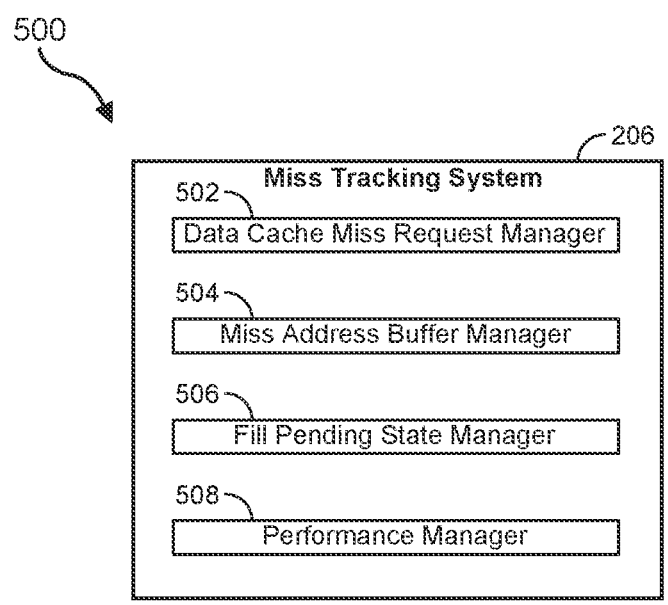
FIG. 5 is a detailed diagram of the miss tracking system according to one or more implementations.

The following will provide, with reference to FIGS. 1-5, detailed descriptions of example systems for tracking data cache miss requests using data cache tags. For example, FIG. 1 provides detailed descriptions of corresponding computer-implemented methods for the same. Additionally, FIG. 2 shows an example implementation of a miss tracking system operating in connection with a processor of a computing device. To provide additional context for the solutions provided by the load management system, FIG. 3 illustrates how one or more example data caching systems can utilize a miss address buffer. The remaining FIGS. 4A-5 illustrate how the miss tracking system solves the problems experienced by example data caching systems utilizing a fill-pending flag within cacheline tags to track active miss requests relative to those cachelines.

FIG. 1 is a flow diagram of an example computer-implemented method 100 for tracking miss requests utilizing data cache tags. The steps shown in FIG. 1 can be performed by any suitable computer-executable code and/or computer hardware. In one example, each of the steps shown in FIG. 1 can represent an algorithm whose structure includes and/or is represented by multiple sub-steps, examples of which will be provided in greater detail below.

As illustrated in FIG. 1, at step 102 one or more of the systems described herein can generate a first data cache miss request associated with data requested in connection with a cacheline. For example, one or more of the systems described herein can detect or receive a load operation from a program being executed by a processor, one or more components of a processor, and/or a program being executed by another component within a computing device. In one or more implementations, one or more of the systems described herein, can detect or receive the load operation that includes a reference to a memory location.

The systems described herein can further attempt to retrieve data from the memory location referenced by the load operation. In one or more implementations, the systems described herein can find the cacheline corresponding to the memory location present in the first data cache or can find the cacheline corresponding to the memory location not-present in the first data cache. In the event that the system finds data in the cacheline of the first cache, the system can return the data to the load operation from the first cache. If the system does not find the cacheline in the first data cache, the system can generate a data cache miss request. For example, the system can generate the data cache miss request including the memory location referenced by the load operation. In additional implementations, the systems described herein can detect or receive the data cache miss request from another data caching system associated with the processor.

At a step 104, in response to generating the data cache miss request associated with the cacheline, the systems described herein can allocate a miss address buffer (MAB) entry associated with the first data cache miss request. For example, the systems described herein can configure space within the MAB to hold information associated with the first data cache miss request. In one or more implementations, the MAB holds this information to indicate that there is an active miss request pending in other levels of data cache for this address.

At a step 106, the systems described herein can set a fill-pending flag in a tag associated with the cacheline in response to the data associated with the first data cache miss request being absent from the first data cache. For example, in some implementations, the systems described herein can set the fill-pending flag in a tag of that cacheline while determining whether the data requested in connection with the first data cache miss request exists in a second (e.g., a level-two) data cache.

The systems described herein can further de-allocate the MAB entry for the cacheline at a step 108. For example, while a program's execution searches the level-two data cache for data requested by the load operation, the systems described herein can set a fill-pending flag in the tag of the cacheline in the first (e.g., level-one) cache by adding one or more portions of data from the data cache miss request to the tag of the cacheline. For instance, the systems described herein can add information such as the address of the cacheline, a timestamp associated with the load operation, an indication of the memory location that is missing the requested data, and so forth. In additional implementations, the systems described herein can set a fill-pending flag of the tag of the cacheline by changing a designated bit in the tag to true (e.g., 1). Furthermore, the systems described herein can de-allocate the MAB entry by clearing the previous entry, or otherwise releasing the data within the previous MAB entry.

At this point, the systems described herein can track whether there is an active miss request associated with the cacheline by checking the fill-pending flag in the tag of that cacheline within the level-one cache. In response to receiving or otherwise detecting additional load or store operations associated with the same data, the systems described herein can check the level-one data cache for this data and will match this fill-pending cacheline. Because the cacheline data is still not yet present in the level-one data cache, the load or store operation cannot complete. In light of the pending miss request associated with that cacheline, however, the load or store operation can wait for the fill response to that cacheline. As such, the systems described herein limit use of the MAB to the time it took to transmit the miss request to the level-two cache. This is generally much faster than example systems that utilize the MAB for the duration of the entire miss request cycle. Accordingly, the systems and methods described herein increase the efficiency of the MAB by increasing the number of miss requests that the MAB can accommodate over time.

In one or more implementations, the systems and methods described herein reference many terms and phrases. For example, the term "processor," as used herein, can refer to a machine that processes information. An example of a processor can include, without limitation, a central processing unit (CPU) of a computer. For example, processors can process instructions that drive a computing device (e.g., a laptop computer, a desktop computer, a mobile computing device, a smart wearable device). In one or more implementations, a processor can include logic circuitry (e.g., and gates, or gates, nor gates, xor gates, arithmetic logic units), data buses, data storage devices (e.g., flash memories), etc. A computing device can include one or more processors, and in some implementations, multiple processors within the same device can work in concert.

In one or more implementations, the terms "processor data cache," "data cache," level-n data cache (e.g., level-one data cache, level-two data cache), first data cache, second data cache, etc. can refer to a data layer implemented by or associated with a processor. For example, a data cache can include a plurality of storage registers or dedicated data storage units that can store information in bits, bytes, words, or so forth. In at least one implementation, a data cache can store information that is copied from a main memory of the processor for faster processing (e.g., due to being close to the processor core). For example, a data cache can store data in a manner that is fully associative, N-way set associative, or directly mapped. Some data cache can allow for speculative execution of operation within cacheline of the data cache. In at least one implementation, systems or methods described herein can copy the same data from main memory to two or more locations within the same data cache and/or to two or more levels of data cache. In one or more implementations, a first data cache can refer to a level-one data cache. Similarly, a second data cache can refer to a level-two data cache.

As used herein, the term "cacheline" can refer to a block of data storage within the data cache. For example, a cacheline can be a memory block or blocks that holds data in a predetermined layout. To illustrate, a cacheline can have multiple segments, registers, or fields dedicated to different types of information. Each of the cacheline fields can store a number of bytes, and each byte can include a number of bits. As such, a cacheline can have a size that depends on the number of fields within the cacheline, a number of bytes within each field, and a number of bits in each byte. In one or more implementations, a bit can be the smallest unit of memory and can store binary information (e.g., a 1 or a 0).

In one or more implementations, a predetermined field in or associated with a cacheline can be referred to as a "tag" or "cacheline tag." For example, systems and methods described herein can store information associated with the cacheline in the cacheline tag. The cacheline tag can be a part of the cacheline within the data cache. Additionally or alternatively, the cacheline tag can be stored in a separate structure from the data cache. In that implementation, the separate structure can store the cacheline tag under an indexing schema that correlates the cacheline tag with the correct cacheline in the data cache.

In one or more implementation, as used herein bits of a cacheline and/or cacheline tag can be set, re-set, and flash cleared. As used herein, the term "set" can refer to the act of reversing one or more binary bits. Additionally, the term "set" can refer to the act of changing one or more bits from 0 to 1. Conversely, the term "re-set" can refer to the act of changing, clearing, or erasing one or more binary bits from 1 to 0. In at least one implementation, a bit can be re-set as the result of a flash clear. For example, a flash clear can apply a voltage to the bit that causes the current value of the bit (e.g., 1) to be erased.

As mentioned above, cachelines can be accessed by various operations. As an example, the processor can execute a load operation by locating a cacheline corresponding to a memory location indicated by the load operation and reading out any data stored by the cacheline. Cachelines can be accessed by load and store operations that originate from the same processor associated with the cacheline's data cache, or from other processor components or computing device components outside of that processor.

The systems and methods described herein can be implemented in a variety of ways. For example, as shown in FIG. 2, an implementation 200 of these systems and methods can include a miss tracking system 206 operating within a processor 204 within a computing device 202. As will be discussed in greater detail below, the miss tracking system 206 can operate in connection with a miss address buffer (MAB) 210, a level-one data cache 208, a level-two data cache 214, and a level-three data cache 216. In additional implementations, the miss tracking system 206 can operate in connection with additional data caches and/or memory layers that can be part of the processor 204 or part of another system or component of the computing device 202.

The computing device 202 generally represents any type or form of computing device capable of reading computer-executable instructions. Additional examples of the computing device 202 can include, without limitation, laptops, tablets, desktops, servers, cellular phones, personal digital assistants (PDAs), multimedia players, embedded systems, wearable devices (e.g., smart watches, smart glasses), smart vehicles, so-called Internet-of-Things devices (e.g., smart appliances), gaming consoles, variations or combinations of one or more of the same, or any other suitable computing device.

In one or more implementations, the processor 204 can include one or more physical microprocessors. For example, the processor 204 generally represents any type or form of hardware-implemented processing unit capable of interpreting and/or executing computer-readable instructions. In one example, the processor 204 can access and/or access, modify, and/or execute instructions and/or data stored in the level-one data cache 208, the level-two data cache 214, the level-three data cache 216, or any other memory associated with the computing device 202. Examples of the processor 204 can include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, or any other suitable physical processor.

As mentioned above, the miss tracking system 206 can perform various acts in connection with the MAB 210 and/or the caches 208, 214, and 216. In one or more implementations, the MAB 210 and the caches 208, 214, and 216 can be memory structures within the processor 204. In at least one implementation, the MAB 210 can include a miss address buffer entry 218, while the level-one data cache can include a cacheline 212 potentially including data. Moreover, each of the additional caches 214, 216 can also include cachelines potentially including data.

The memories (e.g., the MAB 210, the caches 208, 214, and 216) and other memories associated with the processor 204 can generally represent any type or form of volatile or non-volatile storage device or medium capable of storing data and/or computer-readable instructions. In one example, such memories can store, load, and/or maintain data which can then be copied into one or more cachelines. In one or more implementations, the processor 204 can move or copy data from a main memory or other memory to a cacheline of the level-one data cache 208 for faster execution and processing. Examples of such memories can include, without limitation, random access memory (RAM), read only memory (ROM), flash memory, hard disk drives (HDDs), solid-state drives (SSDs), optical disk drives, caches, variation or combinations of one or more of the same, or any other suitable storage memory.

While FIG. 2 illustrates an example implementation of the miss tracking system 206, other implementations are possible. For example, in additional implementations, the processor 204 can include fewer or more data caches as well as many other components. Moreover, the computing device 202 can include additional processors, each with the same or different components as those of the processor 204. Additionally, the computing device 202 can include additional system memories as well as other components.

As mentioned above, example data caching systems rely on a miss address buffer (MAB) to track miss requests associated with processor operations (e.g., load operations, store operations). FIG. 3 illustrates the inefficiencies and inflexibilities of relying only on a MAB to track miss requests. For example, as shown in FIG. 3, an example data caching system 300 can receive a load operation 302. In one or more implementations, the load operation 302 can request data located at a particular memory location associated with a cacheline of the level-one data cache 208. The example data caching system 300 can determine that the requested data is not in the level-one data cache 208.

In response to determining that the data requested by the load operation 302 is not present in the level-one data cache 208, the example data caching system 300 can generate a miss request 307. In one or more implementations, the example data caching system 300 can generate the miss request 307 including an indication of the particular memory location referenced by the load operation 302. The example data caching system 300 can further transmit the miss request 307 to the MAB 210. The example data caching system 300 can further allocate a miss address buffer entry 218 for the miss request 307. The example data caching system 300 can further transmit the miss request 307 to the next level of data cache (e.g., the level-two data cache 214).

In one or more implementations, the example data caching system 300 can determine whether the requested data is present in the level-two data cache 214. If the example data caching system 300 does not find the requested data in the level-two cache, the example data caching system 300 can further transmit the miss request 307 to the level-three data cache 216. In one or more implementations, the example data caching system 300 can continue transmitting the miss request 307 to lower levels of memory until the requested data is found.

In at least one implementation, as shown in FIG. 3, the example data caching system 300 can find the requested data 308 in the level-three data cache 216. In response to finding the requested data 308, the example data caching system 300 can generate a fill response 310 including the requested data 308. The example data caching system 300 can further transmit the fill response 310 back to the MAB 210.

Upon receipt of the fill response 310 at the MAB 210, the example data caching system 300 can de-allocate the miss address buffer entry 218 and can load the requested data 308 back into the level-one data cache 208. The example data caching system 300 can further provide or generate a load response 312 including the requested data in response to the load operation 302.

As illustrated in FIG. 3, the example data caching system 300 keeps the miss address buffer entry 218 allocated from receipt of the miss request 307 until receipt of the fill response 310. Upon allocation of the miss address buffer entry 218, the example data caching system 300 generally has no way of predicting where among the many lower levels of memory the requested data will be found. As such, the miss address buffer entry 218 can remain in the MAB 210 for a potentially large number of processor cycles. As discussed above, this is problematic as the MAB 210 is typically smaller than the level-one data cache 208 and can quickly fill up with miss requests from the level-one data cache 208. If the MAB 210 receives a miss request but has no additional space for another miss address buffer entry, the MAB 210 will cause all additional operations relative to the level-one data cache 208 to stall until more space in the MAB 210 opens up.

To solve these and other problems, as shown throughout FIGS. 4A-4C, the miss tracking system 206 utilizes a fill-pending flag in a tag of the cacheline of a requested memory location to track miss requests and dramatically increase the throughput of the MAB 210—thereby improving the miss request capabilities of the processor 204 and reducing time spent by the processor 204 in a stalled state. For example, as shown in FIG. 4A at a step 400, the miss tracking system 206 can receive the first load operation (e.g., similar to the load operation 302 as shown in FIG. 3) requesting data from a particular memory location. In response to the data associated with the first load operation being absent from a first or level-one data cache, the miss tracking system 206 can generate a data cache miss request associated with the first load operation 302 at a step 404. In additional implementations, the miss tracking system 206 can generate the data cache miss request in response to the data cache miss request being generated by another component of the processor 204 or the computing device 202.

At a step 406, the miss tracking system 206 can allocate a MAB entry associated with the data cache miss request. For example, the miss tracking system 206 can configure a space in the MAB 210 and can write data to the configured space that is associated with the data cache miss request. To illustrate, the miss tracking system 206 can write information to the MAB entry identifying or including indications of the cacheline associated with the requested data and/or the load operation 302. In at least one implementation, as mentioned above, the same data can be copied to various memory locations within multiple layers of data cache. Accordingly, the miss tracking system 206 can maintain an index that correlates the various memory locations where the data is copied. As such, in at least one implementation, the miss tracking system 206 can write data to the MAB entry associated with this indexing.

At a step 408, the miss tracking system 206 can forward or transmit the miss request to the level-two data cache 214. Upon transmitting the miss request to the level-two data cache 214, at a step 410, the miss tracking system 206 can allocate a location 306 in the level-one data cache to hold the cacheline associated with the requested data and can update the tag with the address of the requested cacheline. At this point, the miss tracking system 206 does not write the cacheline data into the allocated location 306. The miss tracking system 206 further sets the fill-pending flag 402 of the cacheline that will eventually be filled into the location 306. For example, the miss tracking system 206 can set the fill-pending flag 402 by changing a binary value of one or more bits in the tag of the eventual cacheline (e.g., from zero to one). In additional implementations, the miss tracking system 206 can set the fill-pending flag 402 in other ways such as, but not limited to: by writing a timestamp indicating when the fill request was sent to the level-two data cache 214 into the tag, by writing the miss request into the tag, and so forth.

At a step 412, the miss tracking system 206 can further de-allocate the MAB entry associated with the data cache miss request. For example, as discussed above, the miss tracking system 206 can release the MAB entry for the data cache miss request because the cacheline tag with the fill-pending flag 402 of the cacheline that will be filled into the location 306 now tracks the same information. Accordingly, the miss tracking system 206 can de-allocate the MAB entry by flash clearing the MAB entry from the MAB 210, by erasing the MAB entry from the MAB 210, by setting a flag indicating that the space previously taken up by the MAB entry is available to be written over, or by any other suitable means. At this point, as shown in FIG. 4A, the cacheline is now associated with a set fill-pending flag 402 indicating that there is at least one active fill request associated with that cacheline that will fill in the location 306.

While the cacheline is associated with the set fill-pending flag 402 and waiting for a fill response to be received from one or more lower cache levels, the miss tracking system 206 can further utilize the fill-pending flag 402. For example, as shown in FIG. 4B at a step 414, the miss tracking system 206 can receive or otherwise detect a second load operation associated with the cacheline that will fill in the location 306. For example, the second load operation can request data associated with the cacheline that will fill in the location 306.

In one or more implementations, it can be inefficient for the miss tracking system 206 to generate additional data cache miss requests associated with this cacheline. For example, it would be inefficient to generate an additional data cache miss request associated with the cacheline because there is already a miss request pending to additional levels of memory for the data that should be filled in as part of the cacheline. Moreover, the data at other memory locations can depend on or from the data within the cacheline. As such, the miss tracking system 206 can waste computational resources by generating additional data cache miss requests associated with the cacheline until a response is received from the currently active fill request.

Accordingly, as shown in FIG. 4B at a step 416, the miss tracking system 206 can determine whether the fill-pending flag 402 is set. As mentioned above, the fill-pending flag 402 indicates whether there is a currently active fill request associated with the cacheline that will fill in the location 306. In response to determining that the fill-pending flag associated with the cacheline is not set (e.g., "No" in the step 416 meaning that there is no pending fill request associated with the cacheline), the miss tracking system 206 can match or allocate a MAB entry in a step 417. In response to determining that the fill-pending flag 402 is set (e.g., "Yes" in the step 416 meaning that there is a pending fill request associated with the cacheline, the miss tracking system 206 can take no further action at a step 418—specifically, by not generating an additional data cache miss request and/or allocating a MAB entry associated with the second load operation.

In more detail, the miss tracking system 206 can generally engage in a number of steps in connection with load and store operations-such as, for example, the second load operation received in the step 414. For example, upon first detecting a load or store operation, the miss tracking system 206 can search the tag (e.g., a structure holding tag information associated with the level-one data cache cachelines) for information associated with a particular cacheline associated with the detected load or store operation. In one or more implementations, the miss tracking system 206 can search the tag to determine whether the particular cacheline is allocated in a usable coherent state (i.e., not a fill-pending state). If the cacheline is allocated and not in a fill-pending state, the miss tracking system 206 can use the particular cacheline to fulfill the detected load or store operation. If the tag indicates that the particular cacheline is allocated but in a fill-pending state, the miss tracking system 206 can wait (e.g., stall the detected load or store operation) until a fill response associated with the miss request is received.

Additionally, in some implementations, the miss tracking system 206 can search the tag to determine that the particular cacheline is not allocated within the level-one data cache. In response to making this determination, the miss tracking system 206 can search the MAB for an entry associated with the particular cacheline. In response to determining that there is a MAB entry associated with the particular cacheline, the miss tracking system 206 can "attach" (e.g., monitor) that MAB entry and wait for a location to be allocated in the level-one cache for the particular cacheline. In response to determining that there is no MAB entry associated with the particular cacheline, the miss tracking system 206 can allocate a new MAB entry associated with the particular cacheline and generate/transmit a new miss request associated with the particular cacheline. A second load or store operation associated with the same cacheline (e.g., as received in the step 414) can match the first load or store operation at any of these steps and either use coherent data or wait until a fill response is received.

Ultimately, as discussed above, the miss tracking system 206 continues to monitor for and receive a fill response associated with the cacheline. As mentioned above, the fill response corresponding to the miss request (e.g., generated in the step 404) can include a cacheline including the requested data from a lower cache, along with an address of a location in the in first cache where the cacheline may be stored. For example, as shown in FIG. 4C, the miss tracking system 206 can monitor, at a step 420, for fill responses associated with the cacheline that will fill in the location 306. For example, the miss tracking system 206 can monitor for fill responses to the level-one data cache location 306 (e.g., index and way) that was allocated for this miss request (e.g., generated in the step 404) and associated with the fill-pending flag 402.

In more detail, the miss tracking system 206 can transmit additional information the level-two data cache 214 when the location 306 is allocated (e.g., in the step 410). For example, the miss tracking system 206 can transmit the level-one data cache location 306 (e.g., index and way) that was allocated to eventually hold the cacheline associated with the requested data. In one or more implementations, the level-two data cache 214 can maintain the index and way of the location 306 in a buffer corresponding to the miss request. For example, the buffer corresponding to the miss request is dissimilar from the MAB 210 in that the buffer is not checked by any operation and is not part of a critical pipeline within the processor 204. In one or more implementations, the level-two data cache 214 can return the index and way of the location 306 along with a fill response corresponding to the miss request (e.g., generated in the step 404).

Accordingly, at steps 422 and 424, the miss tracking system 206 can utilize the index and way of the location 306 and cacheline associated with the requested data (e.g., received as part of the fill response from the level-two data cache 214) to re-set the fill-pending flag 402 and fill in the cacheline to the location 306. For example, the miss tracking system 206 can re-set the fill-pending flag 402 by changing a value of the fill-pending flag 402 from one to zero. In additional implementations, the miss tracking system 206 can re-set the fill-pending flag 402 by clearing the fill-pending flag 402 to NULL. Additionally, the miss tracking system 206 fill in the location 306 by loading the cacheline 426 received as part of the fill response into the location 306. Following this, at a step 428, the miss tracking system 206 can return the requested data from the cacheline 426 to the load operation 302. The miss tracking system 206 can also return the requested data to any other operation that requested the data from the cacheline 426 following the load operation 302 (e.g., the second load operation received in the step 414).

FIG. 5 illustrates a block diagram of an example implementation 500 of the miss tracking system 206 as discussed throughout. As mentioned, the miss tracking system 206 performs many functions in connection with tracking data cache miss requests utilizing data cache tags. Accordingly, FIG. 5 provides additional detail with regard to these functions. For example, as shown in FIG. 5, the miss tracking system 206 can operate as software, firmware, or as a logic layer within the processor 204. In one or more implementations, the miss tracking system 206 can include a data cache miss request manager 502, a miss address buffer manager 504, a fill-pending state manager 506, and a performance manager 508. Although FIG. 5 illustrates as separate elements, one or more of the components 502-508 of the miss tracking system 206 can be combined in additional implementation. Similarly, in additional implementations, the miss tracking system 206 can include additional, fewer, or different components.

In certain implementations, the miss tracking system 206 can represent one or more software applications or programs that, when executed by a processor, can cause the processor to perform one or more tasks. For example, and as will be described in greater detail below, one or more of the components 502-508 of the miss tracking system 206 can represent software stored and configured to run on one or more computing devices. One or more of the components 502-508 of the miss tracking system 206 shown in FIG. 5 can also represent all or portions of one or more special-purpose computers configured to perform one or more tasks.

As mentioned above, and as shown in FIG. 5, the miss tracking system 206 can include the data cache miss request manager 502. In one or more implementations, the data cache miss request manager 502 receives or detects load or store operations, detects or determines whether load or store operations can be successfully executed, and generates or detects data cache miss requests. For example, in some implementations, the data cache miss request manager 502 can generate a miss request in response to a notification from another processor component indicating an unsuccessful load or store operation. In one or more implementations, the data cache miss request manager 502 can generate a data cache miss including one or more of an indication of the unsuccessful load or store operation or an indication of the cacheline associated with the requested data. In additional implementations, the data cache miss request manager 502 can receive a data cache miss request from another processor component. The data cache miss request manager 502 can further transmit data cache miss requests to the miss address buffer manager 504.

As mentioned above, and as shown in FIG. 5, the miss tracking system 206 can include the miss address buffer manager 504. In one or more implementations, the miss address buffer manager 504 can receive data cache miss requests, allocate MAB entries, and de-allocate MAB entries. For example, as discussed above, the miss address buffer manager 504 can allocate MAB entries by configuring a blank MAB entry and adding miss request information into the configured MAB entry. The miss address buffer manager 504 can add the entire miss request into the MAB entry or can add a portion of the miss request. Additionally, the miss address buffer manager 504 can de-allocate MAB entries by flash-clearing, overwriting, erasing, or any other suitable method. In at least one implementation, the miss tracking system 206 can further transmit miss requests to the level-two data cache 214.

As mentioned above, and as shown in FIG. 5, the miss tracking system 206 can include the fill-pending state manager 506. In one or more implementations, the fill-pending state manager 506 sets a fill-pending flag or state of a tag associated with a cacheline corresponding to requested data in response to determining that a miss request associated with the requested data has been transmitted to a next level of data cache (e.g., the level-two data cache 214). For example, in one implementation, the fill-pending state manager 506 can set the fill-pending flag within a tag associated with a cacheline corresponding to requested data by copying a corresponding miss request from a MAB entry into the tag. Furthermore, the fill-pending state manager 506 can additionally or alternatively set the fill-pending flag by changing one or more bits of the tag of a cacheline. Additionally, the fill-pending state manager 506 can re-set a fill-pending flag by erasing or otherwise clearing miss request information out of the tag of a cacheline.

As mentioned above, and as shown in FIG. 5, the miss tracking system 206 can include the performance manager 508. In one or more implementations, the performance manager 508 can employ various methods to manage and improve the performance of the miss tracking system 206. For example, in one implementation, the performance manager 508 can set certain limits on the miss tracking system 206 to help avoid various error states. To illustrate, in one implementation, the performance manager 508 can increase the efficiency of the miss tracking system 206 by periodically limiting a number of cachelines in the data cache that can be in a fill-pending state (i.e., that can have a fill-pending flag set). In an additional implementation, the performance manager 508 can also increase the efficiency of the miss tracking system 206 by prefetching data to the level-two data cache 214. In that implementation, in response to determining that the number of cacheline tags of the data cache 208 with their fill-pending flags set exceeds a predetermined threshold, the performance manager 508 can inform the level-two data cache 214 to change the miss request to a prefetch-to-level-two operation, instead of going through the process of filling the requested data to the level-one data cache 208. Additionally, in at least one implementation, the performance manager 508 can further limit the level-one data cache 208 (i.e., a 12-way data cache) to only 11 ways and specify that the 12th way can only be put into a fill-pending state by an oldest load or store operation to ensure forward-progress for the oldest operation.

Thus, as described throughout, the miss tracking system 206 presents a flexible and efficient solution to the technical problems that arise in response to conventional use of a miss address buffer. For example, in one or more implementations as described above, the miss tracking system 206 holds miss request information in the MAB 210 only for the amount of time it takes to transmit the corresponding miss request to a next level of data cache. Accordingly, while example data caching systems tie up MAB resources for an unknown amount of time while waiting for a fill response to the corresponding miss request to be received, the miss tracking system 206 quickly releases those same MAB resources in a consistent fraction of the time. As such, the miss tracking system 206 successfully avoids the processor stalls that commonly arise from conventional use of the MAB, while ensuring that the same miss request information is accurately tracked within the existing tags of cachelines in the level-one data cache 208.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the miss tracking system 206 in FIGS. 1-5 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   generating a first data cache miss request associated with data requested in connection with a cacheline; and
   while the first data cache miss request is active:
      allocating a miss address buffer entry associated with the first data cache miss request;
      setting a fill-pending flag in a tag associated with the cacheline in response to the data associated with the first data cache miss request being absent from a first data cache; and
      de-allocating the miss address buffer entry associated with the first data cache miss request.

2. The computer-implemented method of claim 1, further comprising:
   receiving a second load or store operation referencing the data previously requested in connection with the cacheline;
   in response to the fill-pending flag in the tag associated with the cacheline being set, monitoring for a fill response associated with the first data cache miss request; and
   upon receiving the fill response associated with the first data cache miss request, providing the data requested in connection with the first data cache miss request to the second load or store operation.

3. The computer-implemented method of claim 1, wherein generating the first data cache miss request is in response to:
   receiving a first load request for data associated with the cacheline; and
   failing to locate the data in the first data cache.

4. The computer-implemented method of claim 3, wherein allocating the miss address buffer entry associated with the first data cache miss request comprises:
   configuring a blank entry in a miss address buffer; and
   adding information associated with the first data cache miss request to the blank entry in the miss address buffer.

5. The computer-implemented method of claim 1, further comprising:
   receiving a fill response associated with the first data cache miss request; and
   re-setting the fill-pending flag in the tag associated with the cacheline.

6. The computer-implemented method of claim 5, wherein receiving the fill response associated with the first data cache miss request comprises receiving the cacheline associated with the requested data and an indication of a location allocated for the cacheline in the first data cache.

7. The computer-implemented method of claim 1, further comprising:
   transmitting, to a second data cache, an index and way of a location in the first data cache to hold the cacheline associated with the first data cache miss request; and
   receiving, from the second data cache, a fill response associated with the first data cache miss request including the index and way of the location in the first data cache to hold the cacheline.

8. The computer-implemented method of claim 1, further comprising:
   failing to locate the data associated with the first data cache miss request in a second data cache; and
   transmitting the first data cache miss request to a third data cache.

9. A processor comprising:
   a level-one data cache, a level-two data cache, and a level-three data cache;
   a miss address buffer; and a logic layer that causes the processor to:
   generate a first data cache miss request associated with data requested in connection with a cacheline; and
   while the first data cache miss request is active:
      allocate a miss address buffer entry associated with the first data cache miss request;
      set a fill-pending flag in a tag associated with the cacheline in response to the data associated with the first data cache miss request being absent from a first data cache; and
      de-allocate the miss address buffer entry associated with the first data cache miss request.

10. The processor of claim 9, wherein the logic layer further causes the processor to:
   receive a second load or store operation referencing the data previously requested in connection with the cacheline;
   in response to the fill-pending flag in the tag associated with the cacheline being set, monitor for a fill response associated with the first data cache miss request; and
   upon receiving the fill response associated with the first data cache miss request, provide the data requested in connection with the first data cache miss request to the second load or store operation.

11. The processor of claim 9, wherein the logic layer further causes the processor to generate the first data cache miss request in response to:
   receiving a first load request for data associated with the cacheline; and
   failing to locate the data in the first data cache.

12. The processor of claim 11, wherein the logic layer further causes the processor to allocate the miss address buffer associated with the first data cache miss request by:
   configuring a blank entry in a miss address buffer; and
   adding information associated with the first data cache miss request to the blank entry in the miss address buffer.

13. The processor of claim 9, wherein the logic layer further causes the processor to:
   receive a fill response associated with the first data cache miss request; and
   re-set the fill-pending flag in the tag associated with the cacheline.

14. The processor of claim 13, wherein the logic layer further causes the processor to receive the fill response associated with the first data cache miss request by receiving the cacheline associated with the requested data and an indication of a location allocated for the cacheline in the first data cache.

15. The processor of claim 9, wherein the logic layer further causes the processor to:
   transmit, to a second data cache, an index and way of a location in the first data cache to hold the cacheline; and
   receive, from the second data cache, a fill response associated with the first data cache miss request including the index and way of the location in the first data cache to hold the cacheline.

16. The processor of claim 9, wherein the logic layer further causes the processor to:
   failing to locate the data associated with the first data cache miss request in a second data cache; and
   transmit the first data cache miss request to a third data cache.

17. A system comprising:
at least one processor; and
physical memory comprising computer-executable instructions that, when executed by the at least one processor, cause the at least one processor to perform acts comprising:
generating a first data cache miss request associated with data requested in connection with a cacheline; and
while the first data cache miss request is active:
   allocating a miss address buffer entry associated with the first data cache miss request;
   setting a fill-pending flag in a tag associated with the cacheline in response to the data associated with the first data cache miss request being absent from a first data cache; and
   de-allocating the miss address buffer entry associated with the first data cache miss request.

18. The system of claim 17, wherein the physical memory further comprises computer-executable instructions that, when executed by the at least one processor, cause the at least one processor to perform acts comprising:
   receiving a second a second load or store operation referencing the data previously requested in connection with the cacheline;
   in response to the fill-pending flag in the tag associated with the cacheline being set, monitoring for a fill response associated with the first data cache miss request; and
   upon receiving the fill response associated with the first data cache miss request, provide the data requested in connection with the first data cache miss request to the second load or store operation.

19. The system of claim 18, wherein the physical memory further comprises computer-executable instructions that, when executed by the at least one processor, cause the at least one processor to perform acts comprising:
   failing to locate the data associated with the first data cache miss request in a second data cache; and
   transmitting the first data cache miss request to a third data cache.

20. The system of claim 19, wherein the physical memory further comprises computer-executable instructions that, when executed by the at least one processor, cause the at least one processor to perform acts comprising:
   receiving a fill response associated with the first data cache miss request; and
   re-setting the fill-pending flag in the tag associated with the cacheline.

\* \* \* \* \*